United States Patent
Robertson

(10) Patent No.: US 7,914,615 B2
(45) Date of Patent: Mar. 29, 2011

(54) CONTINUOUS PROCESS FOR PREPARING PIGMENT FLUSH

(75) Inventor: George H. Robertson, Loveland, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 860 days.

(21) Appl. No.: 11/414,356

(22) Filed: May 1, 2006

(65) Prior Publication Data

US 2006/0196388 A1 Sep. 7, 2006

Related U.S. Application Data

(63) Continuation-in-part of application No. 10/956,117, filed on Oct. 4, 2004, which is a continuation of application No. 10/102,422, filed on Mar. 20, 2002, now abandoned.

(51) Int. Cl.
*C09D 11/00* (2006.01)
*C08K 5/00* (2006.01)

(52) U.S. Cl. ....... 106/31.6; 106/463; 106/494; 106/412; 106/495; 106/497

(58) Field of Classification Search ................ 106/31.6, 106/493, 494, 412, 495, 497, 498
See application file for complete search history.

(56) References Cited

U.S. PATENT DOCUMENTS

| | | | |
|---|---|---|---|
| 3,398,113 A * | 8/1968 | Godshalk et al. | 524/197 |
| 4,287,000 A * | 9/1981 | Buckwalter | 106/412 |
| 4,309,223 A | 1/1982 | Rouwhorst et al. | |
| 4,474,473 A * | 10/1984 | Higuchi et al. | 366/75 |
| 5,151,026 A | 9/1992 | Andersen et al. | |
| 5,264,032 A * | 11/1993 | Dietz et al. | 106/411 |
| 6,273,599 B1 * | 8/2001 | Affeldt et al. | 366/76.1 |
| 2004/0242738 A1 * | 12/2004 | Bauer et al. | 524/115 |
| 2006/0037517 A1 * | 2/2006 | Teeley et al. | 106/493 |

FOREIGN PATENT DOCUMENTS

| WO | WO-01/19927 A1 | 3/2001 |
|---|---|---|
| WO | WO-03/080740 A1 | 10/2003 |

* cited by examiner

*Primary Examiner* — Jerry Lorengo
*Assistant Examiner* — Veronica Faison Gee
(74) *Attorney, Agent, or Firm* — Dickstein Shapiro LLP

(57) ABSTRACT

A process for continuous flush of a pigment press cake involves applying a dispersant to the press cake to produce a fluidized press cake, continuously feeding the fluidized press cake into a twin screw extruder and mixing it with a neutralizing agent in the extruder, mixing the neutralized press cake with a liquid organic medium in the extruder to produce an organic flush phase and a water phase, and removing at least part of the water phase from the extruder through one or more parts of the extruder.

20 Claims, 1 Drawing Sheet

CONTINUOUS PROCESS FOR PREPARING PIGMENT FLUSH

This is a continuation-in-part of application Ser. No. 10/956,117, filed Oct. 4, 2004 which was a continuation of application Ser. No. 10/102,422 filed on Mar. 20, 2002 now abandoned.

FIELD OF THE INVENTION

The present invention relates to a continuous flush process.

BACKGROUND OF THE INVENTION

Syntheses of many organic pigments include a coupling step in a dilute aqueous medium to produce a slurry of the pigment product, which is typically followed by filtering the slurry in a filter press to concentrate the pigment. The press cake that results is then either dried to provide a dry, particulate pigment or else is "flushed" with an organic medium ("varnish") such as an oil and/or resin in order to transfer the pigment particles from the aqueous press cake to the oil or resin phase. Flushing assists in keeping pigment particles from becoming agglomerated and makes it easier to use the pigment when making inks or coatings.

The flushing process is an alternative processing to drying the pigment. If the pigment is used in an ink or coating composition it must first be well-dispersed in an appropriate organic medium in order to achieve the desired color development and stability, and thus the flushing process is advantageous because it accomplishes the transfer without intermediate steps of drying the pigment and grinding the pigment in the organic medium to produce a pigment dispersion.

In the past, pigment flushes have usually been prepared by batch processes in which the press cake is kneaded with an organic phase such as an oil and/or a resin, for example in a sigma blade mixer or dough mixer, to flush the pigment particles from the water phase to the organic medium phase (varnish) and displace the water as a separate aqueous phase. The displaced water is separated and the dispersion of the pigment in the varnish can be used as a pigment paste in preparing an ink or paint.

The batch process has many shortcomings. First, the steps of adding varnish, kneading the resulting dough to displace the water, and pouring off the water must usually be repeated a number of times in order to obtain the optimum yield and a product with the desired low water content. This is a labor-intensive process that requires careful monitoring. Further, in order to remove residual water, the batch must be further treated, such as by heating and stripping under vacuum. For many pigments, the heat used during such processing to remove the residual water may result in a color shift. Further, the process is time-consuming and inefficient. Finally, it is difficult to reduce the water content below about 3% by weight, even with the vacuum stripping.

Continuous flush processes have been suggested in the past, but those processes have also had shortcomings. U.S. Pat. No. 4,474,473 describes a process for continuously flushing pigment press cake on equipment that includes a co-rotating, twin screw extruder and which requires a press cake that has a pigment content of 35 wt. % or more. The '473 patent discloses that press cakes having a pigment content of from 15 to 35 weight percent cannot be used in the continuous process because of problems with obtaining constant flow feeding. The range of 15-35 wt. %, however, is the range of pigment content that is typically obtained for press cakes. While dilution of the press cake with water to form a liquid slurry of lower pigment content was previously suggested, the '473 patent takes the opposite direction of increasing pigment content to 35 wt. % or more to provide a "lump cake" that is apparently suitable for constant flow feeding as a free-flowing solid. Increasing the pigment content of the manufactured press cake, however, requires a time-consuming process of shaping the press cake and drying it with circulating air until the desired water content is obtained.

An example of the methods using diluted press cake is disclosed in U.S. Pat. No. 4,309,223 wherein a pigment flush is prepared from a press cake using a single screw extruder and a slurry containing only about 0.5 wt. % to 10 wt. % by weight of pigment. The amount of water added during the flushing process make it difficult to get a clean break or separation between the phases. In addition, more aqueous waste is produced. Finally, it is often the case that the single screw extruder does not provide a sufficient amount of mixing shear to adequately flush the press cake.

U.S. Pat. No. 5,151,026, discloses an extruder apparatus for removing liquid from an aqueous mass of comminuted solids such as crumb rubber, wood pulp, and ground plastic materials that are cleansed during recycling processes. The water is squeezed out of the aqueous mass in a pinch point. The pinch point pressure results from applying a backward force by means of a reverse-threaded section of the screw immediately at the liquid extraction location. The process removes from water relatively large solid pieces that do not appear to associate or agglomerate and is different from the pigment flush process where the transfer of fine pigment particles from aqueous press cake to an organic phase, usually including a resin, followed by separation of the two liquid phases (aqueous and organic) is of concern. Two key considerations in the flush process are clean separation of the organic and aqueous phases and good dispersion of the pigment particles. The pinch point method is unsuitable for the two-phase pigment flushing process because the pinching force would interfere with the necessary phase separation between aqueous and organic phases. The pigment particles also have a tendency to agglomerate. The pinch point would thus be unsuitable for the additional reason that squeezing the pigment would cause undesirable agglomeration of the pigment particles, which would in turn impair dispersion of the pigment.

A continuous flush process is disclosed in U.S. Pat. No. 6,273,599 wherein a mechanically fluidized presscake requiring shear is fed into a twin extruder to provide a flush.

SUMMARY OF THE INVENTION

It has now been found that a process for continuous flush of a pigment press cake can be realized by employing by first applying a dispersant to the press cake to produce a fluidized press cake, then continuously feeding the fluidized press cake through a pump and into a twin screw extruder and mixing with a neutralizing agent in the extruder, followed by mixing the neutralized press cake with a liquid organic medium in the extruder to produce an organic flush phase and a water phase, and finally removing at least part of the water phase from the extruder through one or more parts of the extruder.

The present invention also provides a method of preparing an ink composition containing flush prepared as described above.

Other objects and advantages of the present invention will become apparent from the following description and appended claims.

DETAILED DESCRIPTION

Figure 1:
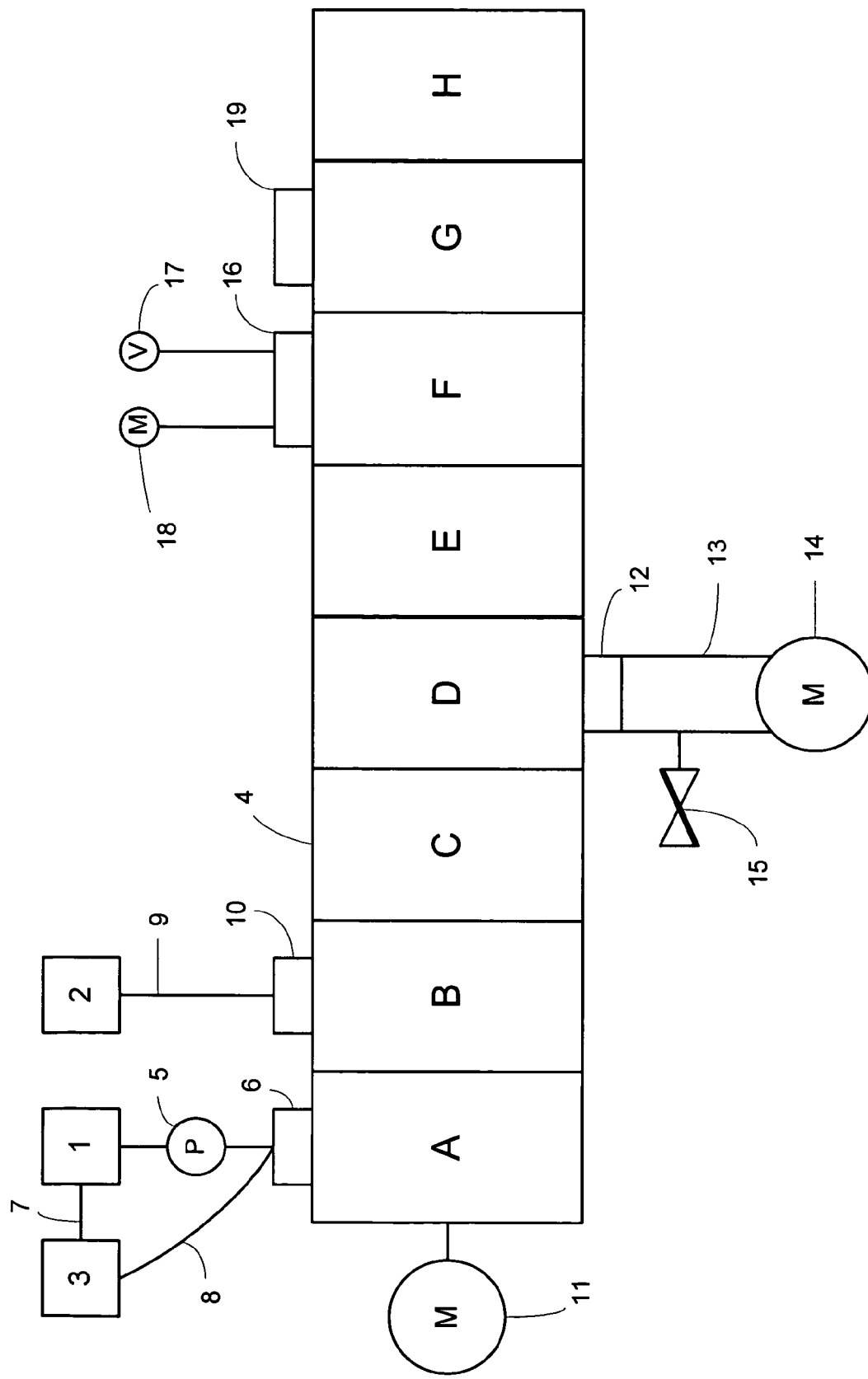
FIG. 1 is a schematic diagram of one embodiment of the press cake system of the invention.

The invention provides a process in which a pigment in press cake form is flushed by transferring the pigment particles from the aqueous press cake to an organic medium, especially to an oil or resin phase. The press cake may be from the synthesis of any of a number of organic pigments. Examples of suitable press cakes include, without limitation, press cakes of diarylide yellow pigments (e.g., Pigment Yellow 12, Pigment Yellow 13), phthalocyanine pigments, calcium lithol rubine, calcium lithol red, alkali blue, barium lithol red, rhodamine yellow, rhodamine blue, and so on. Press cakes of organic pigments typically have a water content by weight of from about 12% to about 35%, although press cakes such as those of certain blue pigments may have a water content as high as 45%.

The process includes applying a dispersant to the press cake to produce a fluidized press cake. Suitable dispersant include, but are not limited to sodium rosinate, methylene bisnapthalene sufonic acid, sodium salt of oleic acid, and the like. It is preferred that the dispersant is an ionic species, especially alkali metal salts of rosinates or fatty acids. The dispersant may be added in an amount of about 1 part to about 20 parts pigment press cake.

The fluidized press cake is then readily continuously fed through a pump and into a twin screw extruder and mixed with a neutralizing agent in the extruder. The neutralizing agent is a chemical which neutralizes the acid or base function of the dispersing agent and thereby destabilizes the dispersion. Suitable neutralizing agents (which neutralize the charge on the dispersant) include, but are not limited to solutions of aluminum sulfate, calcium chloride, acetic acid (for neutralizing anionic dispersants) and fatty carboxylic acids, rosin acids, or the alkali metal salts of these compounds (to neutralize cationic dispersants), and the like. It is preferred that the neutralizing agent is aluminum sulfate or acetic acid for anionic dispersant salts and sodium rosinate for cationic dispersants. The neutralizing agent may be added in an amount of about 0.8-1.2 parts per ionic equivalent of dispersant. The agent may be employed as a solution in a solvent appropriate to the particular chemical.

The neutralized press cake is mixed with a liquid organic medium such as, but not limited to, hydrocarbon resins, modified hydrocarbon resins, rosin esters, rosin modified hydrocarbon resins, alkyd resins, phenolic resins, polyesters, maleic resins, rosin-modified varnishes of any of these, polyamide resins, polyvinyl chloride resins, vinyl acetate resins, vinyl chloride/vinyl acetate copolymer resins, chlorinated polyolefins, polystyrene resins, acrylic resins, polyurethane resins, ketone resins, vegetable oils including linseed oil, soybean oil, neatsfood oil, coconut oil, tung oil, mineral oils, and so on. Combinations of such resins and oils may also be employed. The resin, oil, or combination thereof may be combined with a hydrophobic organic solvent or liquid, including high boiling petroleum distillates. The relative amount of the liquid organic medium and the fluidized press cake for optimum processing can be determined based upon the particular materials chosen, but in general the amounts remain the same as those expected for conventional batch processing. For example, the amount of liquid organic medium introduced per unit of time may be from about 0.6 to about 2 times the amount of solid pigment introduced in the same unit of time. The ratio of liquid organic medium to solid pigment may be adjusted according to factors known in the art, such as the type of pigment and the type of liquid organic medium.

An organic flush phase and a water phase is produced, and the water is removed though the extruder.

Turning to FIG. 1, the system includes a feed component which includes a press cake dispersion supply 1, an organic medium supply 2, and a neutralizing agent supply 3, and a twin screw extruder 4. Preferably, the feed component includes a pump 5. The pump may be any type suitable for the viscosity of the fluidized press cake. Examples of suitable pumps include, without limitation, lobe pumps, gear pumps, or other positive displacement pumps.

A fluidized press cake is transported from supply 1 to a port 6 disposed at an upstream portion of extruder 4. Extruder 4 has a series of sections or barrels labeled in the FIGURE as A through H. For convenience only, the diagramed extruder is shown with 4 sections have 2 barrels each, it being understood that the total, number of barrels and number of barrels in each section can be varied as desired. In the preferred example of FIG. 1, port 6 is in the first section or barrel A of extruder 4 but it could also be in a later barrel. The extruder has at least two zones, and optionally has a third and/or a fourth zone. In a first zone, represented in FIG. 1 by sections A and B, the fluidized press cake, the neutralizing agent and organic medium are mixed in the extruder to flush the pigment from the aqueous phase to the organic phase. The neutralizing agent may be provided from its supply 3 to the press cake supply 1 through line 7 or alternatively to extruder 4 through line 8 which communicates with port 6 or a separate port. The organic medium is conveyed from its supply 2 through a line 9 preferably to a second port 10 in extruder 4, although it can, if desired, be conveyed to port 6. Preferably, the fluidized presscake and neutralizing agent are mixed in an area of this mixing zone which is upsteam of the point that the organic medium is introduced. If desired, a second series of supplies and ports can be provided in one or more downsteam barrels, such as for instance barrel C. Alternatively, a second group of press cake, neutralizing agent and organic solvent supplies can be provided to the same ports as used for the first group.

In a second zone, represented by sections C and D, at least a portion the water displaced during the flushing operation is removed by draining or drawing the liquid from extruder 4. In a third zone, which is optional but preferred, represented by sections E and F, residual water is removed (as water vapor) by vacuum dehydrating the pigment flush through one or more vacuum ports. In the forth zone, also optional, represented by sections G and H, the flush can be further mixed and one or more other ink components may be added and mixed with the pigment flush. The optional fourth zone can be used to produce an ink base or finished ink composition product.

Extruder 4 is a twin-screw extruder, with the screws being driven by motor 11. The screws are preferably co-rotating. At least one fluidized press cake is fed into the extruder through port 6. Preferably, each fluidized presscake feed is associated with a neutralizing agent feed at the same or next available feed point. The liquid organic medium, preferably including at least an oil, a resin, or resin solution, is also fed into the extruder, which may be through port 6 or preferably through second port 10. The liquid organic medium is sufficiently hydrophobic to allow a non-aqueous phase to form in the process. Types of organic materials that are suitable to prepare pigment are well-known in the art. If the extruder has two different fluidized press cake feeds by ports 6 and 10, the organic medium may be fed through either or through yet another separate port.

The liquid organic medium may be introduced in the same barrel, or section, of the extruder as the fluidized press cake, either into the same port or a different port. Alternatively, the liquid organic medium may be introduced in another section close to the upstream end of the extruder first zone, as shown in FIG. 1 by the port 10 in section B. The liquid organic medium may be fed from a line or tank, which may have a stirrer, and may be metered in with, for example, a pump. Preferably, the liquid organic medium and the fluidized press cake are each introduced at fairly constant rates.

The fluidized press cake, neutralizing agent and liquid organic medium are mixed in one or more sections of the first zone of the extruder to wet the pigment with the organic medium, displacing water from the press cake and producing a preliminary pigment flush. A screw section with a plurality of kneading disks may be used in the first zone where the flushing takes place. In one preferred embodiment of the invention, the screw profile in the first zone tapers from a deep channel used in the section or sections having a feeding port gradually to a shallow channel in a later (downstream) section or section of the first zone. The length of the first zone of the extruder in which the fluidized press cake, neutralizing agent and the liquid organic medium are mixed is sufficiently long so that the pigment is flushed completely. The rotational speed of the screw also is a factor for efficient flushing. A preferred range for rotational speed of the screw is from about 150 to about 550 rpm, and a more preferred range for rotational speed is from about 450 to about 550 rpm.

The displaced water and the crude pigment flush continue traveling in the extruder to the second zone of the extruder where at least a portion of the displaced water is removed. In the second zone, preferably a major portion of the displaced water is removed, more preferably at least about 80%, still more preferably at least about 90%, and even more preferably all but a residual amount of water that clings to the pigment flush is removed. Referring to FIG. 1, the second zone of the extruder includes sections C-D. The second zone of the extruder includes a port or vent 12 for removing, preferably by draining off, the displaced water. While the water may be withdrawn by other means, gravity draining is the simplest and is therefore preferred. The port 12 shown in the FIGURE is connected to a section 13 having therein a screw turned by motor 14 that drives the relatively viscous pigment-containing flush back into the section D while letting the water drain out of section D. Collected water is drained via valve 15.

A feature of the second zone is a dam that retains the pigment flush for a time sufficient to allow most of the displaced water to drain from the crude flush mass. As known, the dam may be formed by a reversed-threaded extruder screw. Preferably in this stage water is introduced into the barrel to further wash the flush and remove ionic species. The dam causes the kneaded press cake/organic medium to dwell over the port long enough to allow more of the displaced water to drain from the kneaded pigment. A portion of the mixture of press cake and liquid organic medium is carried into the dammed section of the extruder and remains in that section until the portion works its way out of the pocket of retained material and is carried into the next section by the grabbing action of the screw.

Because more of the water is drained from the flush in a liquid phase than is being evaporated, as compared to prior methods, the final product contains a lower concentration of salts. The dam thus improves the purity of the product.

The third zone of the extruder, which is optional but preferred, includes one or more vacuum ports 16 connected to a vacuum source 17 to draw off residual water clinging to the pigment flush. The water is drawn off as water vapor. Suitable vacuum ports are known to be used with extruders and typically can include a area 17 containing a screw turned by motor 18 in the vacuum port to help retain the flush in the extruder. A vacuum pump is typically connected to the vacuum port to provide the reduced pressure. The profile of the screw used for in area 17 preferably has a shallow channel, which tends to increase the efficiency of vacuum dehydration by shaping the material in a thin layer form. There can be identical vacuum ports on consecutive extruder sections, if desired, although the ports need not be identical nor need the sections be consecutive.

The present process is particularly advantageous for preparing flushes having improved viscosity and higher percentage of pigment. While not being bound by theory, it is believed that the dispersing agent assist in dispersing the presscake and the neutralizing agent breaks that dispersion fluidity by neutralizing the ionic functionality of the dispersing agent thus removing the activity as a soluble dispersing agent. The pigment feed of the present invention thus has a lower viscosity and higher pigment content.

The flush of the present invention may be used to prepare an ink composition according to usual methods. Additional resins, oils, solvents or other components of the organic medium may be added after the vacuum port to adjust the composition of the pigment flush or at some point before the pigment flush is discharged, preferably after the vacuum zone, such as into a port on the extruder. The flushed pigment dispersion and other ink component(s) are combined in the extruder so that the output from the extruder is an ink base or ink composition. Typical resins used as ink varnishes that may be added include but are not limited to alkyd resins, polyesters, phenolic resins, rosins, cellulosics, and derivatives of these such as rosin-modified phenolics, phenolic-modified rosins, hydrocarbon-modified rosins, maleic modified rosin, fumaric modified rosins; hydrocarbon resins, vinyl resins including acrylic resins, polyvinyl chloride resins, vinyl acetate resins, polystyrene, and copolymers thereof; polyurethanes, polyamide resins, and the like and combinations thereof. Suitable examples of organic solvents that may be added include, but are not limited to aliphatic hydrocarbons such as petroleum distillate fractions and normal and isoparaffinic solvents with limited aromatic character. Any of the many additives known in the art that may be included in the ink compositions of the invention, so long as such additives do not significantly detract from the viscosity or pigment content of the flush of the present invention. Illustrative examples of these include, but are not limited to pour point depressants, surfactants, wetting agents, waxes, emulsifying agents and dispersing agents, defoamers, antioxidants, UV absorbers, dryers (e.g., for formulations containing vegetable oils), flow agents and other rheology modifiers, gloss enhancers, and anti-setting agents. When included, additives are typically included in amounts of at least about 0.001% of the ink composition, and the additives may be included in amounts of up to about 7% by weight or more of the ink composition. The additives can be added through a port 19 located in a barrel of the forth zone of twin-screw extruder 4.

The invention is illustrated by the following examples. The examples are merely illustrative and does not in any way limit the scope of the invention as described and claimed.

Example 1

Six flushes were prepared of the components set forth in Table 1 below.

|  | 1-A | 1-B | 1-C | 1-D | 1-E | 1-F |
|---|---|---|---|---|---|---|
| Pigment | 100$^{(a)}$ | 100$^{(b)}$ | 100$^{(b)}$ | 100$^{(c)}$ | 100$^{(b)}$ | 100$^{(d)}$ |
| Dispersant | 10$^{(e)}$ | 10$^{(e)}$ | 5$^{(f)}$ | 10$^{(e)}$ | 10$^{(x)}$ | 10$^{(e)}$ |
| Neutralizing Agent | 1.5$^{(g)}$ | 2.0$^{(g)}$ | 2.0$^{(g)}$ | 1.5$^{(h)}$ | 2.5$^{(g)}$ | 2.0$^{(i)}$ |
| Liquid Organic Medium | 10$^{(j)}$, 54$^{(k)}$, 36$^{(l)}$ | 10$^{(m)}$, 54$^{(k)}$, 36$^{(l)}$ | 10$^{(j)}$, 54$^{(m)}$, 36$^{(l)}$ | 60$^{(o)}$, 40$^{(l)}$ | 10$^{(j)}$, 70$^{(p)}$, 45$^{(l)}$ | 10$^{(m)}$, 60$^{(o)}$, 40$^{(l)}$ |
| Cut Back Materials | 50$^{(o)}$, 50$^{(l)}$ | 50$^{(m)}$, 30$^{(l)}$, 20$^{(r)}$ | 40$^{(m)}$, 50$^{(l)}$, 10$^{(r)}$ | 50$^{(k)}$, 50$^{(l)}$ | 50$^{(p)}$, 40$^{(l)}$, 10$^{(s)}$ | 40$^{(q)}$, 50$^{(l)}$, 10$^{(s)}$ |
| Viscosity | 50 Pas | 50 Pas | 50 Pas | 50 Pas | 50 Pas | 50 Pas |

$^{(a)}$Pigment Red 57:1; 25 percent solids.
$^{(b)}$Pigment Yellow 12; 30 percent solids.
$^{(c)}$Pigment Blue 15:3; 32 percent solids.
$^{(d)}$Pigment Red 57:1; 20 percent solids.
$^{(e)}$Sodium Rosinate.
$^{(f)}$Methylene bisnapthalene sulfonic acid.
$^{(x)}$Sulfonated castor oil
$^{(g)}$Aluminum sulfate; 30% solution.
$^{(h)}$Acetic acid; 20% solution.
$^{(i)}$Calcium chloride; 30% solution.
$^{(j)}$Linseed oil.
$^{(m)}$Hydrocarbon resin.
$^{(o)}$Resin ester resin.
$^{(p)}$Rosin modified hydrocarbon resin
$^{(q)}$Hybrid hydrocarbon resin.
$^{(r)}$Tridecyl alcohol.
$^{(s)}$2,2,4-trimethyl, 1-3-pentanediol diisobutyrate.

Flush was prepared by feeding pigment at the beginning of the first barrel, adding the neutralizing agent and dispersant at the second barrel and the flush vehicle at the third barrel. Water was drained at barrel seven, wash water was added at three points in barrels nine and ten, a vacuum was applied at barrel thirteen and barrel fourteen was provided with a location for adding a mixture of solvents and resin to give a final product mix. The fourteen barrel twin-screw extruder had a diameter of 40 mm and a length/diameter ratio of 58. The feed rate was rated lbs of pigment per hour (lbs/hr).

The final pigment content for all of the above flushes was between about 30 to about 45 wt. %

Example 2

COMPARISON

The process of Example 1 was run with all the same components but omitting the neutralization agent. Flushing of the pigment into the vehicle was very poor and only 15% of the pigment being captured with the remainder going out with the water.

Example 3

COMPARISON

The pumpability and viscosity of the presscake is important. Two presscake containing 25 wt. % and 20 wt. % pigment, respectively, were prepared without the addition of a dispersing agent or neutralizing agent were compared to the flush of Examples 1-B and 1-C. The viscosity are set forth in Table 2 below.

TABLE 2

|  | Viscosity |
|---|---|
| Conventional presscake (25 wt. % pigment content) | 1480 Pa ≅ s |
| Conventional presscake (20 wt. % pigment content) | 620 Pa ≅ s |
| Presscake (25%) and dispersant of Ex 1-B | 50 Pa ≅ s |
| Presscake (25%) and dispersant of Ex1-C | 35 Pa ≅ s |

Addition of the neutralizing agent in place of water did not affect the presscake viscosity.

The invention has been described in detail with reference to preferred embodiments thereof. It should be understood, however, that variations and modifications can be made within the spirit and scope of the invention and of the following claims.

What is claimed is:

1. A process for preparing a flush from a pigment press cake, comprising the steps of: (a) introducing an aqueous fluidized press cake comprising a press cake and a dispersant, a dispersant neutralizing agent and a liquid organic medium into an extruder; (b) mixing the fluidized press cake, neutralizing agent and liquid organic medium in the extruder to produce a pigment flush phase and a water phase; and (c) removing at least part of the water phase from the extruder.

2. A process for preparing a flush of a pigment press cake according to claim 1, comprising the steps of: (a) applying a dispersant to a press cake to produce an aqueous fluidized press cake; (b) continuously feeding the fluidized press cake into a twin screw extruder and mixing with a dispersant neutralizing agent in the extruder; (c) mixing the neutralized press cake with a liquid organic medium in the extruder to produce an organic flush phase and a water phase; and (d) removing at least part of the water phase from the extruder.

3. The process of claim 2, wherein the press cake has up to about 45 wt. % pigment.

4. The process of claim 2, wherein the press cake has about 15 to about 35 wt. % of pigment.

5. The process of claim 2, wherein the press cake has about 30 to about 35 wt. % pigment.

6. The process of claim 2, wherein the amount of dispersant applied is about 1 part to every 20 parts press cake.

7. The process of claim 2, wherein the dispersant comprises sodium rosinate.

8. The process of claim 2, wherein the dispersant comprises sodium oleate.

9. The process of claim 2, wherein the neutralizing agent comprises calcium chloride.

10. The process of claim 2, wherein the neutralizing agent comprises aluminum sulfate.

11. The process of claim 2, wherein the amount of neutralizing agent applied is about 1 part to every 15 parts press cake.

12. The process of claim 11, wherein the press cake has about 15 to about 35 wt. % of pigment, and the amount of dispersant applied is about 1 part to every 20 parts press cake.

13. The process of claim 12, wherein the dispersant comprises sodium rosinate or sodium oleate, and the neutralizing agent comprises calcium chloride or aluminum sulfate.

14. The process of claim 2, wherein the feeding of step (b) is carried out at a substantially constant rate.

15. The process of claim 1, wherein the dispersant is sodium oleate.

16. The process of claim 1 further comprising the step of vacuuming the pigment flush.

17. A process of preparing an ink composition, comprising the steps of: (a) applying a dispersant to a pigment press cake to produce an aqueous fluidized press cake; (b) continuously feeding fluidized press cake to a twin screw extruder; (c) mixing the fluidized press cake with a dispersant neutralizing agent in the extruder to produce an organic flush phase and a water phase; (d) removing water phase from the extruder to produce a pigment flush; and (e) mixing the pigment flush with at least one additional material to produce an ink composition.

18. The process of claim 17, wherein the mixing of step (e) is carried out in the extruder.

19. The process of claim 18, wherein the at least one material mixed with the pigment flush in step (e) is selected from the group consisting of ink varnishes, organic solvents, ink additives, and combinations thereof.

20. The process of claim 17, wherein the at least one material mixed with the pigment flush in step (e) is selected from the group consisting of ink varnishes, organic solvents, ink additives, and combinations thereof.

* * * * *